(12) United States Patent
Nix (10) Patent No.: US 10,221,853 B2
(45) Date of Patent: Mar. 5, 2019

(54) FLUID CIRCULATION MONITORING SYSTEM

(71) Applicant: Sucxess LLC, Birmingham, MI (US)

(72) Inventor: Axel Nix, Birmingham, MI (US)

(*) Notice: Subject to any disclaimer, the term of this patent is extended or adjusted under 35 U.S.C. 154(b) by 0 days.

(21) Appl. No.: 15/583,574

(22) Filed: May 1, 2017

(65) Prior Publication Data

US 2017/0314282 A1    Nov. 2, 2017

Related U.S. Application Data

(60) Provisional application No. 62/330,180, filed on May 1, 2016.

(51) Int. Cl.
*F04D 15/02* (2006.01)
*F04B 49/06* (2006.01)
(Continued)

(52) U.S. Cl.
CPC .......... *F04D 15/0254* (2013.01); *C02F 1/008* (2013.01); *E04H 4/1209* (2013.01); *E04H 4/1245* (2013.01); *E04H 4/1272* (2013.01); *F04B 17/03* (2013.01); *F04B 49/00* (2013.01); *F04B 49/06* (2013.01); *F04B 49/065* (2013.01); *F04B 49/20* (2013.01); *F04B 53/20* (2013.01); *F04D 15/0066* (2013.01); *C02F 1/001* (2013.01); *C02F 2103/42* (2013.01); *C02F 2209/40* (2013.01); *C02F 2303/16* (2013.01); *F04B 2203/0201* (2013.01);
(Continued)

(58) Field of Classification Search
CPC ..... Y10T 137/86397; Y10T 137/86027; Y10T 137/85954; E04H 4/1245; E04H 4/1209; F04B 49/06; F04B 49/065; F04B 49/20; F04B 53/20; F04D 15/0066; F04D 15/0254

See application file for complete search history.

(56) References Cited

U.S. PATENT DOCUMENTS 4,430,214 A   2/1984 Baker
7,484,938 B2  2/2009 Allen
(Continued)

OTHER PUBLICATIONS

Pentair Water Pool and Spa, Inc.; Dura-Glas and Max-E-Glas Centrifugal Pumps with Trap Owner's Manual, S413 (Rev. A), Apr. 15, 2010.

(Continued)

*Primary Examiner* — Atif Chaudry
(74) *Attorney, Agent, or Firm* — Smartpat PLC (57) ABSTRACT

A fluid circulation monitoring system includes a distributed processing system having a first processor located on-premises near a space filled with a circulating fluid and a second processor located off-premises. The first processor and the second processor are in communication with one another. A sensor is operatively connected to the first processor and senses at least one parameter associated with a flow rate of fluid through the circulation system. The distributed processing system is configured to process the at least one parameter and derive a volumetric fluid flow rate through a fluid pump which propels the fluid through the circulation system. Pattern recognition is applied to the at least one parameter to detect maintenance events and predict the need for maintenance events.

14 Claims, 4 Drawing Sheets

(51) Int. Cl.
*E04H 4/12* (2006.01)
*F04B 49/20* (2006.01)
*F04D 15/00* (2006.01)
*F04B 17/03* (2006.01)
*F04B 49/00* (2006.01)
*F04B 53/20* (2006.01)
*C02F 1/00* (2006.01)
*C02F 103/42* (2006.01)

(52) U.S. Cl.
CPC ... *F04B 2203/0202* (2013.01); *F04B 2205/02* (2013.01); *F04B 2205/04* (2013.01); *F04B 2205/09* (2013.01); *F04B 2207/043* (2013.01); *Y10T 137/85954* (2015.04); *Y10T 137/86027* (2015.04); *Y10T 137/86397* (2015.04)

(56) References Cited

U.S. PATENT DOCUMENTS

| | | |
|---|---|---|
| 8,404,112 B2 | 3/2013 | Gaudin |
| 9,273,481 B2 | 3/2016 | Cooke |
| 2002/0070611 A1* | 6/2002 | Cline .................. A61H 33/005 307/149 |
| 2003/0168516 A1 | 9/2003 | Cline |
| 2005/0167345 A1* | 8/2005 | De Wet .................. C02F 1/008 210/85 |
| 2009/0204263 A1* | 8/2009 | Love ..................... G05D 23/19 700/282 |
| 2011/0002792 A1* | 1/2011 | Bartos .................... F04D 15/00 417/44.1 |
| 2013/0007954 A1 | 1/2013 | Sutton et al. |
| 2014/0125150 A1* | 5/2014 | Alberth, Jr. ............ G05B 15/02 307/126 |

OTHER PUBLICATIONS

Pentair Water Pool and Spa, Inc; Dura-Glas ® and Dura-Glas ® II Pool/Spa Pumps by Sta-Rite ®, Mar. 2008.

Unknown Author, CEE Efficient Residential Swimming Pool Initiative, Jan. 2013, retrieved from https://library.cee1.org/system/files/library/9986/CEE_Res_SwimmingPoolInitiative_01Jan2013_Corrected.pdf.

* cited by examiner

FLUID CIRCULATION MONITORING SYSTEM

TECHNICAL FIELD

The present disclosure relates generally to a fluid circulation monitoring system, and more particularly to a pool pump monitoring and control system.

BACKGROUND

Conventional swimming pools and spas include a water circulation system with a pump and a filter for filtering particles and debris from the pool or spa water. The water is usually chemically treated to kill bacteria and algae in the water. The water circulation system ensures that chemicals which have been added to the water are evenly distributed throughout the pool.

Pool pumps are usually powered by an electric motor. The electric motor is commonly connected to a timer which turns the motor on and off at predetermined times. Most often, the timer is set by an end user based on a recommended motor run-time of e.g. 8 hours per day. The motor run time is selected to ensure adequate filtration of the pool without any consideration of actual circulation flow rate and total circulation need. Consequently, pool pumps often run longer than necessary and waste energy.

SUMMARY

A fluid circulation monitoring system is presented which includes a distributed processing system having a first processor located on-premises near a space filled with a circulating fluid and a second processor located off-premises. The first processor and the second processor are in communication with one another. A sensor is operatively connected to the first processor and senses at least one parameter indicative of a flow rate of fluid through the circulation system. The distributed processing system is configured to process the at least one parameter and derive a volumetric fluid flow rate through a fluid pump which propels the fluid through the circulation system. Pattern recognition is applied to the at least one parameter to detect maintenance events and predict the need for maintenance events.

The monitoring system may be applied to a pool water circulation system as is commonly used in residential and commercial pools. The system monitors the operation of an electric pool pump motor which drives a pool pump. The monitoring system includes a distributed processing system having a first processor located on-premises near the pool and a second processor located off-premises away from the pool. The first processor and the second processor are in communication with one another. A sensor is operatively connected to the first processor and senses at least one electric parameter of the electric power applied to the pool pump motor. The at least one parameter may be a current, a voltage, an apparent power, an active power, a reactive power, or a phase angle. The pool pump motor may be a single phase AC motor, the most commonly type installed in the US today. The distributed processing system is configured to process the at least one parameter of the electric power and derive a volumetric water flow through the pool pump.

The distributed processing system may be configured to detect a maintenance event or a need for a maintenance event by recognizing a characteristic pattern of the at least one parameter of the electric power.

The second processor may be programmed to store and analyze data received from the first processor to recognize a pool filter backwash event. A backwash event may be recognized by pattern recognition. In particular, the distributed processing system may recognize a pool filter backwash event by detecting a pool pump motor activation pattern including at least two pattern elements from the following set of pattern elements:

the pool pump motor being on for longer than a predetermined time $t_{continuous}$;
the pool pump motor being off for longer than a predetermined time $t_{port\_adjust\_min}$ and for less than a predetermined time $t_{port\_adjust\_max}$;
the pool pump motor being on for longer than a predetermined time $t_{backwash\_min}$ and for less than a predetermined time $t_{backwash\_max}$;
the pool pump motor being off for longer than a predetermined time $t_{port\_adjust\_min2}$ and for less than a predetermined time $t_{port\_adjust\_max2}$;
the pool pump motor being on for longer than a predetermined time $t_{rinse\_min}$ and for less than a predetermined time $t_{rinse\_max}$; and
the pool pump motor being on for longer than a predetermined time $t_{continuous2}$.

A pool filter backwash event may be detected if all of the event elements are detected in sequence. A pool filter backwash event may be detected even earlier if a subset of the event elements are detected in sequence.

The distributed processing system may determine a minimally desirable volumetric water flow rate and compare the derived volumetric water flow rate through the pool pump with the minimally desirable volumetric water flow rate to generate a maintenance need signal. The minimally desirable volumetric water flow rate may be determined by executing a calibration routine. The calibration routine may include a step instructing a user to a least partially close a valve within the pool water circulation system. The valve may be an inlet valve upstream on the pool pump or an outlet valve downstream of the pool pump.

The distributed processing system may be configured to generate a dry running pump signal when a characteristic value of the at least one parameter of the electric power is detected. The distributed processing system may issue an alert through a user interface device when a dry running pump signal is present.

A monitoring and control system for a pool pump may include a distributed processing system having a first processor located on-premises near a pool and a second processor located off-premises away from the pool. The first processor and the second processor are in communication with one another. A sensor is operatively connected to the first processor. The sensor is configured to sense at least one parameter of an electric power applied to a pool pump motor which drives the pool pump. A switch for turning the pool pump motor on an off is operatively connected to the first processor. The distributed processing system is configured to process the at least one parameter of the electric power and derive a volumetric water flow through the pool pump.

The distributed processing system may calculate a pool pump run time based on a volume of water to be turned over and based on the derived volumetric water flow through the pool pump. The first processor may turn the pool pump on by closing the switch for the calculated run time and opening the switch after the calculated run time has expired.

The distributed processing system may be configured to receive weather information and adjusts the pump run time based on the received weather information.

The distributed processing system may be configured to generate a filter backwash reminder signal when the volumetric water flow through the pool pump falls below a filter backwash alert value. The distributed processing system may be configured to activate a user interface device when a filter backwash reminder signal is present. The filter backwash alert value may be established by detecting a filter backwash event and storing a numeric value associated with the volumetric water flow through the pool pump before the filter backwash event occurred. The filter backwash alert value may be established by filtering multiple values associating the volumetric water flow through the pool pump before multiple filter backwash events.

DETAILED DESCRIPTION

Figure 1:
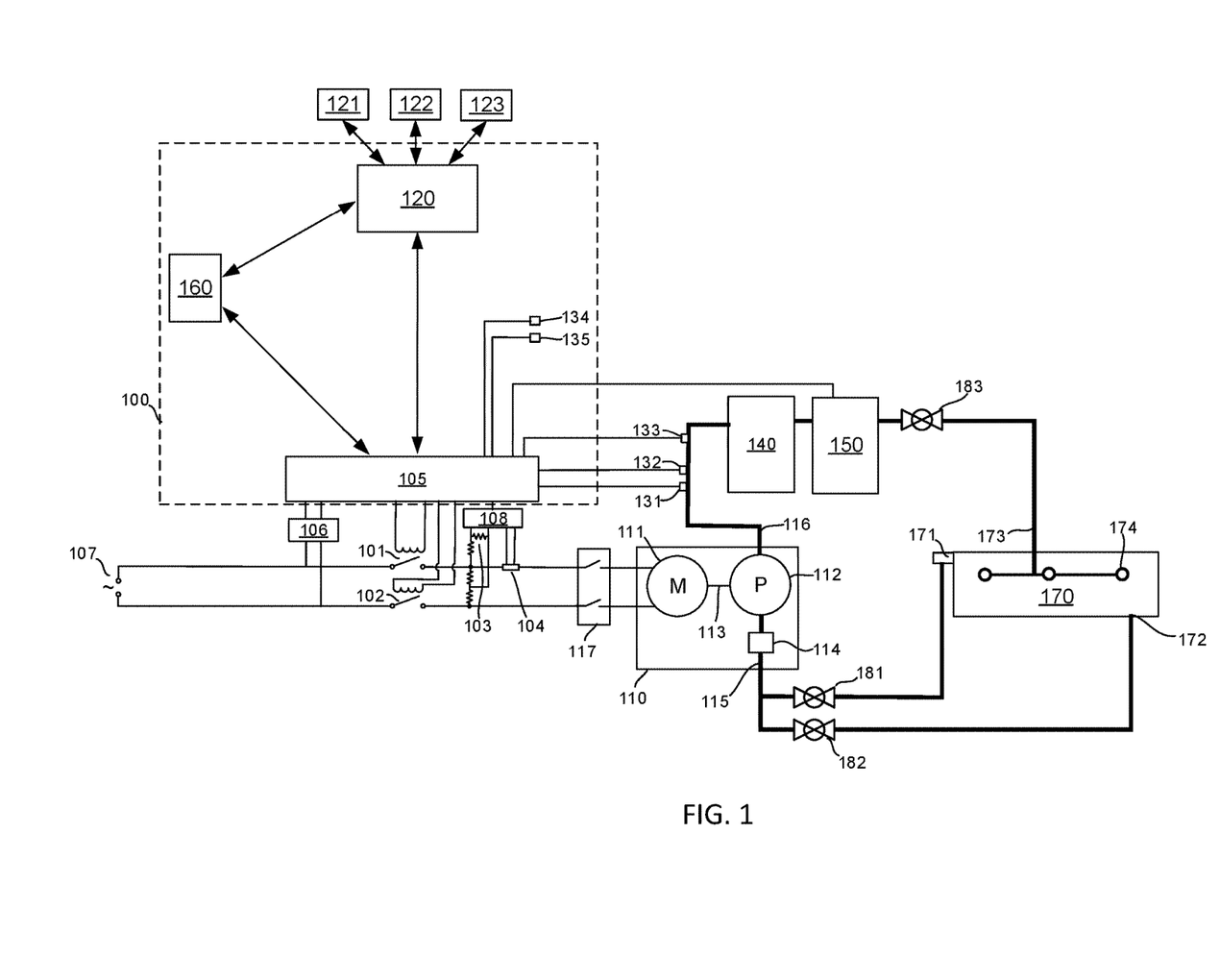
FIG. 1 shows a pool water circulation system and a pool pump monitoring and control system.

FIG. 1 shows schematically a water circulation system for a swimming pool or spa 170. It uses a pool pump 110 which draws water from a suction skimmer 171 and a bottom drain 172 out of the pool 170. The water flows through the pool pump 110, a filter 140, and a heater 150. The water is then returned to the pool through a return line 173 which may terminate in one or more wall-mounted or bottom-mounted return fittings 174.

Flow of water from the skimmer 171 to the pool pump 110 can be controlled by opening and closing a skimmer valve 181. Flow of water from the bottom drain 172 to the pool pump 110 can be controlled by opening and closing a bottom drain valve 182. Flow of water from the pool pump 110 to the return fittings 174 can be controlled by opening and closing an outlet valve 183. The skimmer valve 181 and the bottom drain valve 182 are arranged on the suction side of the pump 110, i.e. upstream of the pump 110. The skimmer valve 181 and the bottom drain valve 182 control the flow of water into the pump. The outlet valve 183 is arranged on the pressure side of the pump 110, i.e. downstream of the pump 110. The outlet valve 183 controls the flow of water out of the pump.

The pool pump 110 comprises an electric motor 111 which is operatively connected to a fluid pump 112 by a shaft 113. The fluid pump 112 may be a rotary impeller pump. A strainer screen or strainer basket 114 is arranged within the pool pump 110 between a water inlet 115 and the fluid pump 112 to collect larger particles, e.g. leaves or larger debris, before reaching the fluid pump 112. The strainer screen or strainer basket 114 must periodically be removed for discharge of the collected leaves and other debris. If too many leaves and/or too much debris accumulates in the strainer screen or basket 114, then the circulation of the pool water will be retarded. In this case, the amount of water flowing through the pump 110 in a given time (the volumetric flow rate) is reduced and so is the total volume of water circulated in a given period of time during which the pump is running.

From an outlet 116 of the pool pump 110 water is pushed through a filter 140 which removes finer particles from the water. The filter 140 may e.g. be a DE (Diatomaceous Earth) type filter; a cartridge type filter or a sand type filter. The most inexpensive of the three kinds of pool filters are the sand filters. This type of filter works by filtering water through a bed of sand. Lateral tubes at the bottom of the sand then separate the clean water from the dirty water. Water is pushed through the filter sand, and as the filter separates the water, the dirty water is sent to the top while the clean water exits through the bottom. Debris can plug up and block sand filters. This causes the pressure in the filter to increase and causes a drop in the flow of water. This can be fixed by running the system in reverse to backwash the filter, leaving it cleaned. The filter is then placed on its rinse mode where it repacks the sand back into the filter. Maintenance on a sand filter can be done manually every couple of weeks to keep the sand filter in proper working order. Sand filters are inexpensive and easy to replace.

A conventional sand filter includes a vessel or tank that holds the sand and other internal parts and includes a multi-port valve or control valve which permits a number of different functions to be selected and performed. For example, the following functions are commonly found on a standard multi-port valve:

(1) Filter: normal filtering and vacuuming;
(2) Backwash: for cleaning the filter bed of accumulated debris;
(3) Rinse: use after completing the backwash cycle to ensure all dirty water is rinsed from the tank to waste;
(4) Waste: by-passes the tank for draining or lowering the pool water level and for vacuuming heavy debris directly to the waste line;
(5) Recirculate: water is recirculated through the valve by-passing the filter; and
(6) Closed: shuts off the flow from the pump to the filter.

The internal parts of the filter include:

(1) A top diffuser that allows the pool water to enter the tank and distributes the water inside the tank;
(2) media (sand) that captures the dirt and debris from the pool water as it flows through; and
(3) laterals that are located under the media and allows the pool water to exit the tank and flow back to the pool.

A water heater 150 may be provided downstream of the water filter 140. A typical water heater 150 employed to heat pool or spa water includes a burner assembly and a heat exchanger assembly enclosed in a housing. A typical burner assembly includes a burner subassembly, a fuel distribution assembly and an igniter. Fuel is supplied to the fuel distribution assembly through a fuel supply line. The fuel is regulated and distributed to the burner subassembly through the fuel distribution assembly. In areas with hot climate the water heater 150 may be replaced with a water cooling system.

A pool monitoring and control system 100 monitors and controls operation of the pool pump 110. The pool monitoring and control system 100 is electrically connected to an electric power source 107, most commonly a home's electrical system. The pool pump can be selectively turned on and off by opening and closing electrically controlled power switches 101,102. The electrically controlled power switches 101,102 are operatively connected to a local processor 105. The electrically controlled power switches 101, 102 may e.g. be contactors, i.e. electromagnetic switches, or solid state power relays. The pool monitoring and control system 100 uses a power supply 106 to provide low voltage direct current, e.g. a 5V or 3.3V supply for the local processor 105 and associated components. A manually operable electric switch 117 may be provided physically close to the pool pump 110 to turn the pump 110 on an off, e.g. to allow for manual maintenance such as cleaning the strainer 114 or backwashing the filter 140.

It is recognized, that pool circulation system are a major consumer of electric energy in homes that have a pool. Increasingly, standard pump motors have been replaced by motors that cost more but produce the same output with approximately 20% greater efficiency. Inexpensive timers have been widely used to limit the pool motor operation to between 8 and 12 hours per day, depending on the volume of the pool and the rate at which the pump circulates pool water through the filter. Some pools also use timers to limit the pool motor operation to "off-peak" hours (typically between 9 p.m. and 6 a.m.) to take advantage of lower electrical rates charged by most utilities during times when system-wide usage is a fraction of the utility's peak generation capacity. These "time of day" controllers reduce the cost of electrical energy but they do not reduce the actual amount of energy required for proper operation of the swimming pool cleaning system. More recently, multiple speed and variable speed motors are replacing single-speed pump motors that operate at a fixed speed of 3450 revolutions per minute (rpm). Variable speed motors allow the pump to be operated at a high rpm when flow requirements are high and at a significantly lower rpm when a lower flow rate is sufficient for long-term functions such as water circulation and filtration. A properly designed variable speed motor will consume less electrical energy at lower speeds than at higher speeds; and, in many cases, the energy savings is disproportionately greater than the reduction in motor speed. For any particular swimming pool, a reduction in the pump run time will produce the greatest amount of energy savings, so long as the reduction in run time does not adversely impact the cleaning, filtration or disinfection functions required for safe and enjoyable long-term use of the pool.

For proper water filtration and treatment of any given swimming pool, it is generally required that a minimum volume of water be circulated through the filter during each 24-hour period. This minimum volume of circulated water in the case of residential pools is generally recognized as being equal to the volume of water in the pool itself. The time required to circulate this volume of water is referred to as the "turnover" time for the particular pool. For an average sized residential pool having a volume of approximately 20,000 gallons, the turnover time would be the time required for the pump to circulate 20,000 gallons through the filter. With a properly sized pump and motor, this turnover time has typically been assumed to require operation of the pump for between 8 and 10 hours each day to assure adequate filtration and treatment of the water. It has also been recognized that the total amount of time required for adequate filtration can increase or decrease for any particular pool depending on how heavily it is used, the time of year and weather conditions that affect the cleaning load on the pool.

The run time of the pool pump is typically selected based on a nominal turnover time, which assumes a nominal water flow through the pool's circulation system. However, in practice, the water circulation can be greatly affected by debris in the pool pump strainer 114 and the pool filter 140.

A 20,000 gallon pool having a circulation system that has a nominal flow rate of 2,500 gallons per hour has a nominal turnover time of 8 hours. In practice, the flow rate may however be reduced to 2,000 gallons per hour, thus causing the actual turnover time to be 10 hours. Today's pool pump control systems fail to account for the actual flow rate of water through the circulation system. The run time of pool pumps is often too long when the strainer 114 and filter 140 are clean, which wastes energy. The run time on the other hand is too short when the strainer 114 or filter 140 are blocked, leading to inadequate filtration of the pool water. Traditional pool circulation systems require a user to constantly monitor the strainer 114 and filter 140 for blockage and do not provide any form of alert when maintenance is required.

Our improved pool monitoring and control system 100 addresses this shortcoming of traditional systems. The control system 100 comprises a voltage monitor 103 and a current monitor 104 to measure voltage (V) and current (I) to the pool pump motor 111. The voltage monitor 103 may be a potential transformer or a resistive voltage divider which is operatively connected to the local processor 105. The current monitor 104 may be a shunt resistor, a current transformer, or a Hall Effect current sensor which is operatively connected to the local processor 105. The pool pump motor 111 is most commonly a single phase 110-120V or 220-240V AC induction motor. The electric power consumed by the motor is related to the pump's volumetric flow. By measuring the motor voltage (U) and current (I) it is possible to deduct the pump's volumetric flow rate ($\dot{V}$) of water and accordingly adjust the pump run time to maintain a desired volume of water to be filtered without relying on just nominal flow rates.

The pool pump motor 111 consumes apparent power (S) which comprises active power (P) and reactive power (Q). The phase angle ($\varphi$) of the voltage (U) relative to the current (I) determines the ratio of active power to apparent power, which is also referred to as the power factor. Assuming sinusoidal waveforms the power factor is the cosine of the phase angle ($\varphi$). The voltage monitor 103 and the current monitor 104 may be operatively connected to a dedicated power/energy IC 108 such as the CS5463 made by Cirrus Logic. The power/energy IC 108 may be connected to the local processor 105 by a serial interface, e.g. SPI or I$^2$C. The power/energy IC 108 may be designed to accurately measure instantaneous current and voltage, and calculate VRMS, IRMS, instantaneous power, apparent power, active power, and reactive power for single-phase, 2- or 3-wire power metering applications.

The control system 100 controls a volume of water to be filtered by selectively adjusting the run time ($t_{on}$) of pool pump motor 111 to obtain a desired turnover volume V.

$$t_{on} = \frac{V}{\dot{V}}$$

The volumetric flow rate ($\dot{V}$) of water through the pump may be determined as a function of voltage, current and phase through the electric pool pump motor 111.

$$\dot{V}=f(U,I,\varphi)$$

Additionally or alternatively the volumetric flow ($\dot{V}$) of water through the pool circulation system may be measured with flow sensor 132,133. The flow sensor 132,133 is operatively connected to the local processor 105. The flow sensor may be an ultrasonic flow sensor based on a run time measurement of an ultrasonic signal traveling in the moving water between a first ultrasonic sensor 132 and a second ultrasonic transceiver 133 or vice versa from the second ultrasonic transceiver 133 to the first ultrasonic transceiver 132. Alternatively or additionally a frequency shift (Doppler Effect) measurement may be used to determine the speed of water flowing through a pipe between the ultrasonic transceivers 132,133. The flow sensor 132,133 may also be an electromagnetic flow meter or a thermal mass flow meter.

The flow sensor 132,133 may alternatively be on one or more pressure sensors. For example, a first pressure sensor may be arranged upstream of the pump 110 and indicate the water pressure on the suction side of the pump 110. A second pressure sensor may be arranged downstream on the pressure side of the pump. The local processor 105 may receive water pressure measurements from both the upstream and the downstream side of the pump 110 and may calculate the volumetric flow ($\dot{V}$) of water through the pool circulation system based thereon.

In yet another alternative arrangement a single differential pressure sensor may be provided which is hydraulically connected to both the upstream and the downstream side of the pump and electrically connected to the local processor 105. The local processor 105 may receive a differential water pressure measurement and may calculate the volumetric flow ($\dot{V}$) of water through the pool circulation system based thereon.

The monitoring system 100 may compare the actual volumetric flow rate with a minimal acceptable flow rate ($\dot{V}_{min}$) to determine if the actual flow rate ($\dot{V}$) has fallen below an acceptable level. If the actual flow rate ($\dot{V}$) is less than the minimal acceptable flow rate ($\dot{V}_{min}$) a maintenance need alert signal may be generated, indicating that cleaning of the strainer 114 or backwashing the filter 140 is required. The alert signal may be communicated through a user interface device 160 to the homeowner or a pool service company.

The local processor 105 may be communicating with a server 120 to create a distributed control system. For example, the local processor 105 may periodically transmit sensor data to the server 120. The sensor data may comprise current information from current sensor 104, voltage information from voltage sensor 103 and phase information derived by the local processor 105 by comparing voltage and current over time. The local processor 105 may also transmit pre-processed information to the server 120, e.g. information that, over time, voltage, current, or phase have changed more than a predetermined absolute or relative value. The local processor 105 may e.g. communicate to the server 120 that the amplitude of current (I) through the current sensor 104 has changed by more than 0.1 A or by more than 1%. A determination whether the volumetric flow of water through the pump has deteriorated may be made by the server 120 based on information received from the local processor 105. The local processor 105, the server 120, and the user interface device 160 may each contain one or more electronic processors such a microprocessors or microcontrollers and jointly form a processing system capable of applying algorithms to inputs in order to compute outputs. The server 120 may be referred to as a second processor which is located off-premises.

Estimates suggest that there are more than 4.5 million in-ground pools, 3.5 million above ground pools and 5 million spas in the United States. These pools vary widely in water volume, and utilize pool pumps made from various manufacturers. It is therefore not practical to specifically design a pool pump monitoring and control system 100 for a particular pool or pool pump. The pool monitoring and control system 100 is rather self-learning and automatically adapts to different pools and pool pumps. It does so by tracking, storing and analyzing sensor data over several days. The pool monitoring and control system 100 may automatically detect maintenance events, e.g. that debris was removed from the strainer 114 by analyzing voltage and current of pool pump motor 111. Removal of debris from the strainer 114 can e.g. be detected based on the following profile:

- a first motor current $I_1$ for longer than $t_{continuous}$ seconds
- a motor current of 0 for more than $t_{strainer\_min}$ and less than $t_{strainer\_max}$ seconds.
- a second motor current $I_2$ for longer than $t_{continuous}$ seconds This current profile suggests that a user has manually turned off power to the pool pump 110 by turning off the manual switch 117. In this example $t_{continuous}$ may be about 600 seconds—generally suggesting a longer period of pool pump operation. $T_{strainer\_min}$ may be about 30 seconds and $t_{strainer\_max}$ may be 600 seconds, suggesting that a user took between 0.5 and 10 min to clean the strainer 114. The first motor current $I_1$ and its associated phase $\varphi_1$ may be stored in the local processor 105 or the server 120 to learn which current is characteristic for a blocked strainer 114. The second motor current $I_2$ and its associated phase $\varphi_2$ may be stored in the local processor 105 or the server 120 to learn which current is characteristic for a clean strainer 114. Knowledge about characteristic motor currents and/or current phases may be learned continuously over many cleaning cycles.

Similarly, backwashing of the filter 140 is another maintenance event which may be detected by analyzing pump current over time. Backwashing requires adjustment of a multiport valve, which can only be done while the pool pump 110 is turned off. A typical backwash cycle will thus start by a user briefly turning off the pool pump 110 using the manual switch 117 to adjust the multiport valve to the backwash setting. The user may then turn the pump 110 back on for 0.5-3 minutes, the recommended time to backwash a filter. The user will then turn the pump off to adjust the multiport valve to a rinse setting, which is followed by turning the pump on for 1-2 minutes while rinsing the filter. The user will then turn the pump off to adjust the multiport valve to the filter setting, followed by an extended period of normal operation.

A typical filter backwash may thus be identified by the following current profile:

- a first motor current $I_1$ for longer than $t_{continuous}$ seconds (indicating normal filtering operation)
- a motor current of 0 for more than $t_{port\_adjust\_min}$ and less than $t_{port\_adjust\_max}$ seconds
- a motor current >0 for more than $t_{backwash\_min}$ and less than $t_{backwash\_max}$ seconds
- a motor current of 0 for more than $t_{port\_adjust\_min}$ and less than $t_{port\_adjust\_max}$ seconds
- a motor current >0 for more than $t_{rinse\_min}$ and less than $t_{rinse?max}$ seconds
- a second motor current $I_2$ for longer than $t_{continuous}$ seconds.

The first current $I_1$ and its associated phase angle $\varphi_1$ and the second current $I_2$ and its associated phase angle $\varphi_2$ may be stored in the local processor 105 and/or the server 120 to learn characteristic current and phase angle values associated with a filter that needs to be cleaned. Over time, the characteristic current and phase angle values before and after backwashing the filter 140 can be used to identify when the strainer 114 and/or the pool filter 140 need to be cleaned, even if it may not be possible to determine the absolute volume flow of water through the pool pump 110. Determining the relative flow rate of water through the pump 110 compared with the flow rate just after cleaning the filter 140 is sufficient to determine when the user should be alerted that pool maintenance is required.

The pool monitoring and control system 100 may learn characteristic values for current (I), phase angle ($\varphi$), apparent power (S), active power (P), reactive power (Q), and power factor (PF) associated with volume flow ($\dot{V}$) through pool pump 110 over the course of several days or weeks. The association of electrical characteristics with volume flow may be accelerated by calibration processes as illustrated in FIG. 3a, FIG. 3b, and FIG. 3c.

Figure 3A:
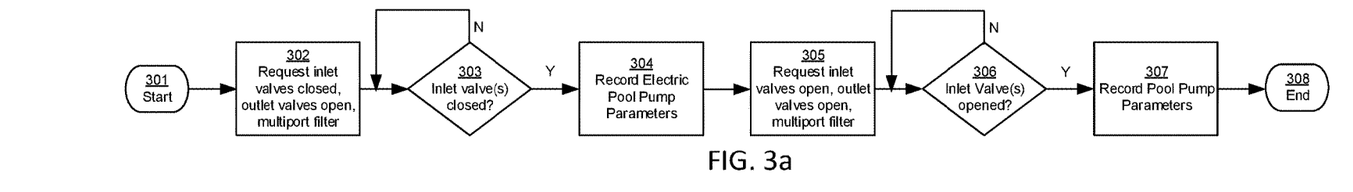
FIG. 3a is a diagram showing steps of a calibration method.

FIG. 3a shows an activity diagram illustrating a method to determine electrical characteristics indicative of a reduced flow of water into the pool pump. This method can be used to simulate a (partially) blocked pool pump strainer 114 in need of cleaning. The method starts with step 301. In step 302 a user is asked to close inlet valves. This step may be performed by providing instructions to the user to close the skimmer valve 181 and the bottom drain valve 182. The instructions may be provided to the user through a user interface device 160. The user interface device 160 may be a smartphone. Step 303 waits for the inlet valve to be closed. This step may be performed by requiring the user to provide affirmative feedback through the user interface device 160. Alternatively, step 303 may be automatically performed by monitoring the electrical characteristics of the pool pump motor, detecting a change in the electrical characteristics, and waiting for the electrical characteristics to stabilize at a new level. In step 304 electric pool pump parameters may be recorded, e.g. by measuring and storing in a non-volatile memory one or more parameters associated with reduced water inflow (RI). The stored parameters may be one or more of the current ($I_{RI}$), phase angle ($\varphi_{RI}$), apparent power ($S_{RI}$), active power ($P_{RI}$), reactive power ($Q_{RI}$), and power factor ($PF_{RI}$) measured while the inlet valve is closed. The user interface device 160 may instruct the user to completely close all inlet valves 181,182 so that the volume flow ($\dot{V}$) becomes zero. Alternatively, the user interface device 160 may instruct the user to partially close the inlet valves 181,182 so that the volume flow ($\dot{V}$) is reduced to a value which simulates a partially blocked pool pump strainer 114 in need of cleaning.

In step 305 the method may instruct the user to reopen the inlet valve, wait for confirmation that the inlet valve has been opened in step 306, and record a normal operation comparison value of the parameters recorded in step 307 for comparison purposes. The method ends in step 308.

Figure 3B:
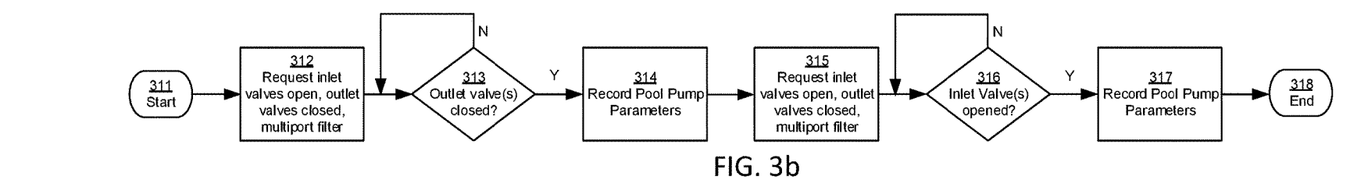
FIG. 3b is a diagram showing steps of a further calibration method.
Figure 3C:
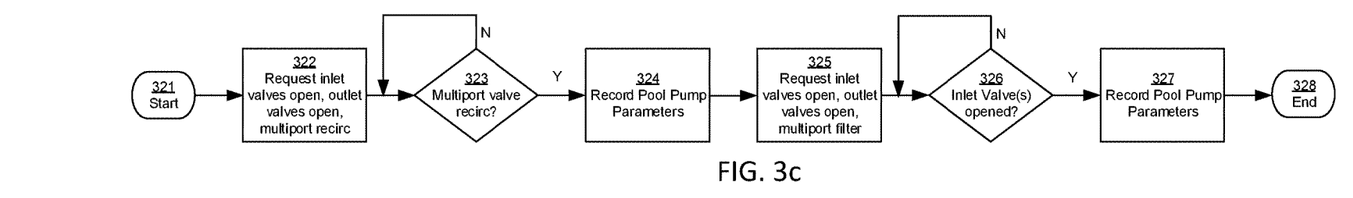
FIG. 3c is a diagram showing steps of yet another calibration method.

FIG. 3b shows an activity diagram illustrating a method to determine electrical characteristics associated with reduced flow of water out of the pool pump. This method can be used to simulate a (partially) blocked pool filter 140 in need to being backwashed or otherwise cleaned. The method starts with step 311. In step 312 the user is asked to close outlet valves. This step may be performed by providing instructions to the user to close the outlet valve 183, e.g. through the user interface device 160. Step 313 waits for the outlet valve to be closed. This step may be performed by requiring the user to provide affirmative feedback through the user interface device 160. Alternatively, step 313 may be automatically performed by monitoring the electrical characteristics of the pool pump motor, detecting a change in the electrical characteristics, and waiting for the electrical characteristics to stabilize at a new level. In step 314 electric pool pump parameters may be recorded, e.g. by measuring and storing in non-volatile memory one or more parameters associated with reduced water outflow (RO). The stored parameters may be one or more of the current ($I_{RO}$), phase angle ($\varphi_{RO}$), apparent power ($S_{RO}$), active power ($P_{RO}$), reactive power ($Q_{RO}$), and power factor ($PF_{RO}$) measured while the outlet valve is closed. The user interface device 160 may instruct the user to completely close all outlet valves 183 so that the volume flow ($\dot{V}$) becomes zero. Alternatively, the user interface device 160 may instruct the user to partially close the outlet valve 183 so that the volume flow ($\dot{V}$) is reduced to a value which simulates a partially blocked filter 140 in need of cleaning. Often, pool filters are provided with a pressure gauge. High pressure in the filter may indicate a need for cleaning the filter. The user interface device may ask the user in step 312 to close the outlet valve 183 slowly and observe rising pressure within the pool filter 140 until the pressure in the pool filter has reached a level where the user would typically clean the filter 140.

In step 315 the method may instruct the user to reopen the outlet valve, wait for confirmation that the inlet valve has been opened in step 316, and record a normal operation comparison value of the parameters recorded in step 317 for comparison purposes. The method ends in step 318.

FIG. 3c shows an activity diagram illustrating a method to determine electrical characteristics associated with unobstructed flow of water through the pool pump. This method can be used to identify the maximum possible flow of water through the circulation system when the pool filter 140 is circumvented. The method starts with step 321. In step 322 the user is asked to switch a multiport valve into the "recirculation" position such that the water flows around the pool filter 140 instead of through it. This step may be performed through the user interface device 160. Step 323 waits for the multiport valve to be switched to "recirculation". This step may be performed by requiring the user to provide affirmative feedback through the user interface device 160. Alternatively, step 323 may be automatically performed, e.g. by detecting that the current drops to zero when the user manually switches the pool pump off to adjust the multiport valve and thereafter switches the pool pump back on. In step 324 electric pool pump parameters may be recorded, e.g. by measuring and storing in non-volatile memory one or more parameters associated with unobstructed water flow (UF). The stored parameters may be one or more of the current ($I_{UF}$), phase angle ($\varphi_{UF}$), apparent power ($S_{UF}$), active power ($P_{UF}$), reactive power ($Q_{UF}$), and power factor ($PF_{UF}$) measured while the outlet valve is closed.

In step 325 the method may instruct the user to switch the multiport valve back to the "filter" setting, wait for confirmation that the multiport valve has been adjusted in step 326, and record a normal operation comparison value of the parameters recorded in step 324 for comparison purposes. The method ends in step 328.

A calibration experiment was performed using an in-ground swimming pool. The pool circulation system was powered by a Century SQ1152 electric motor. The motor has a power rating of 1.5 HP, a maximum load current of 10.4 A, and is rated at 230 V. It was found, that a maintenance event such as cleaning the strainer or backwashing the filter coincided with an increase in apparent power, and increase in active power, and an increase in $\cos(\varphi_{UF})$. The parameters of the current flowing through the pool pump have been found to be indicative of a maintenance event and can therefore be used to predict the necessity of maintenance.

Figure 3D:
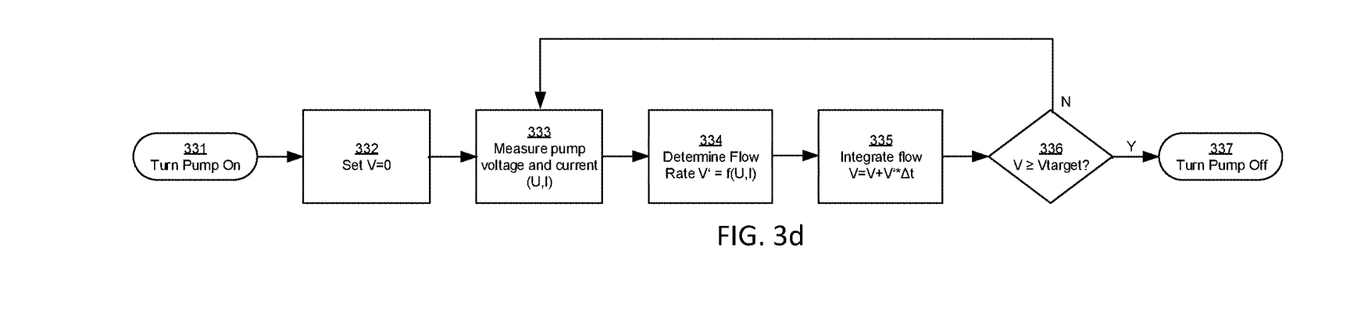
FIG. 3d is a diagram showing a method for operating a pool pump.

FIG. 3d shows an activity diagram illustrating a method to control a pool pump such that it runs until a predetermined target volume of water has been circulated. In a first step 331 the pool pump is turned on. A variable tracking the volume of water that has been turned over is initialized with zero in step 332. The method then enters a loop comprising steps 333 through step 336. In step 333, the electric voltage applied to the pump motor and the electric current flowing through the pump motor are measured. In step 334 a volume flow rate V' is calculated based on voltage and current measured in the previous step. The flow rate V' is integrated in step 335. This is typically done by adding V'*Δt to the variable V. Δt is the cycle time of the loop 333-336. In step 336 the volume of water V that has been turned over since the start of the cycle in step 331 is compared with a target volume $V_{target}$. If the turned over volume is below the target volume the loop is reentered at step 331. If the turned over volume V has reached the target volume $V_{target}$ the method ends in step 337 in which the pool pump is turned off.

The pool monitoring and control system 100 may, in a simple embodiment, not be able to control the pump 110 but rather monitor its current and voltage to provide a signal when maintenance is required. In this embodiment, contactors 101,102 are not present.

In a more complex embodiment, the pool monitoring and control system 100 may not only control a target volume of water to be circulated, but adjust that target volume based on additional inputs. This allows for even more optimized pool pump operation, accounting for the fact that the volume of water that should be circulated depends on many different factors. For example, to prevent growth of algae it is useful to estimate the exposure of the pool to sunlight. To estimate the amount of debris present in the pool it is helpful to know whether it rained, since rain may wash debris into a pool which may cause a need for additional filtration. It is further useful to know how long and to what intensity a pool has been used, as users may cause bacteria, viruses, or debris to enter the pool.

The pool monitoring and control system 100 may process several different inputs to estimate how much water should be circulated. A water temperature sensor 131 may be provided and operatively connected to the local processor 105. Generally, the warmer the pool, the more water should be circulated. A look-up table may be provided in the local processor 105 or the server 120 to associate a target volume of water circulation (turnover volume) with a pool water temperature.

The pool monitoring and control system 100 may obtain weather information 121 (present, past or forecasted) to determine a weather-based adjustment of target volume circulation. The weather information 121 may comprise sunrise time, sunset time, cloud coverage, UV index, air temperature, and precipitation information. Weather information 121 may in particular be obtained from a web service using a standardized API. The weather information 121 should be localized, i.e. the weather information 121 should relate to the geographic location of the pool. This is achieved by storing information related to the geographic location of the pool in the server 120 and/or the local processor 105. The geographic location information may be the postal address of the property on which the pool is located, the ZIP code in which the pool is located, or the latitude and longitude of the pool's location.

The pool monitoring and control system 100 may utilize weather information 121 to determine an outside air temperature below freezing and operate in a freeze protection mode in response thereto. The pool pump control system may obtain a weather forecast or actual weather information via its server 120, e.g. information from the National Digital Forecast Database (NDFD) through a Simple Object Access Protocol (SOAP) web service. If the weather forecast or the actual weather information indicates a risk of freezing, the pool monitoring and control system 100 may turn on the pool pump 110 to run during cold periods in which standing water might freeze and damage the pool circulation system. The pool monitoring and control system 100 may communicate location information by providing an address, a zip code, or latitude and longitude to the server 120 to obtain weather information specifically for the location where the pool monitoring and control system 100 is installed.

The pool monitoring and control system 100 may also communicate with an electric utility provider 122 and allow the electric utility provider 122 to identify times of peak electricity demand at which the pool pump 110 should be turned off. In return for granting the electric utility provider 122 the option to remotely disable the pool pump 110 during times of peak electricity demand the utility provider may offer a lower electricity rate. Information obtained from the electric utility provider 122 may include rate information, associating a time of day with a cost. The pool monitoring and control system 100 may adjust the pool pump run time based on the cost information obtained from the electric utility provider 122 to minimize operating cost of the pool pump 110.

The pool monitoring and control system 100 may further communicate with a pool service provider 123. The pool monitoring and control system 100 may provide information relating to the water throughput of the pool pump 110, state of health information relating to the strainer 114 and/or the filter 140 to the pool service provider 123. The pool service provider 123 may use information obtained from the pool monitoring and control system 100 to provide customized service instead of providing service based on a fixed schedule. For example, the pool service provider 123 may extend or shorten an interval between two cleaning maintenance events based on information obtained from the pool monitoring and control system 100.

The pool monitoring and control system 100 may operate in different modes. In a "timer mode" the pool pump control system may mimic a traditional timer, turning the pool pump on and off at predetermined times. In a "water volume mode" the pool pump control system may turn the pump 110 on at a predetermined time, and adjust the run-time of the pump based on estimated or measured volume flow of water through the pump 110 to guarantee a predetermined amount of water to be circulated. In a "smart mode" the pool monitoring and control system 100 may determine the volume of water to be circulated based on additional inputs as described above.

One input of particular interest in determining the required volume of water to be filtered relates to the usage of a pool. If used lightly or not at all, less water needs to be filtered than if the pool is used more heavily or over a longer time period. Determining the usage of the pool may be accomplished by allowing the owner to enter the usage through user interface device 160. User interface device 160 may e.g. be a smartphone, a tablet computer or the like and communicate wirelessly, e.g. through a cellular phone network, Bluetooth, WiFi, Zigbee or the like, with the local processor 105 and/or the remote server 120. The user interface device may in particular offer an option to enter pool usage by quickly selecting a button associated with "light", "moderate", or "heavy" usage.

Figure 2:
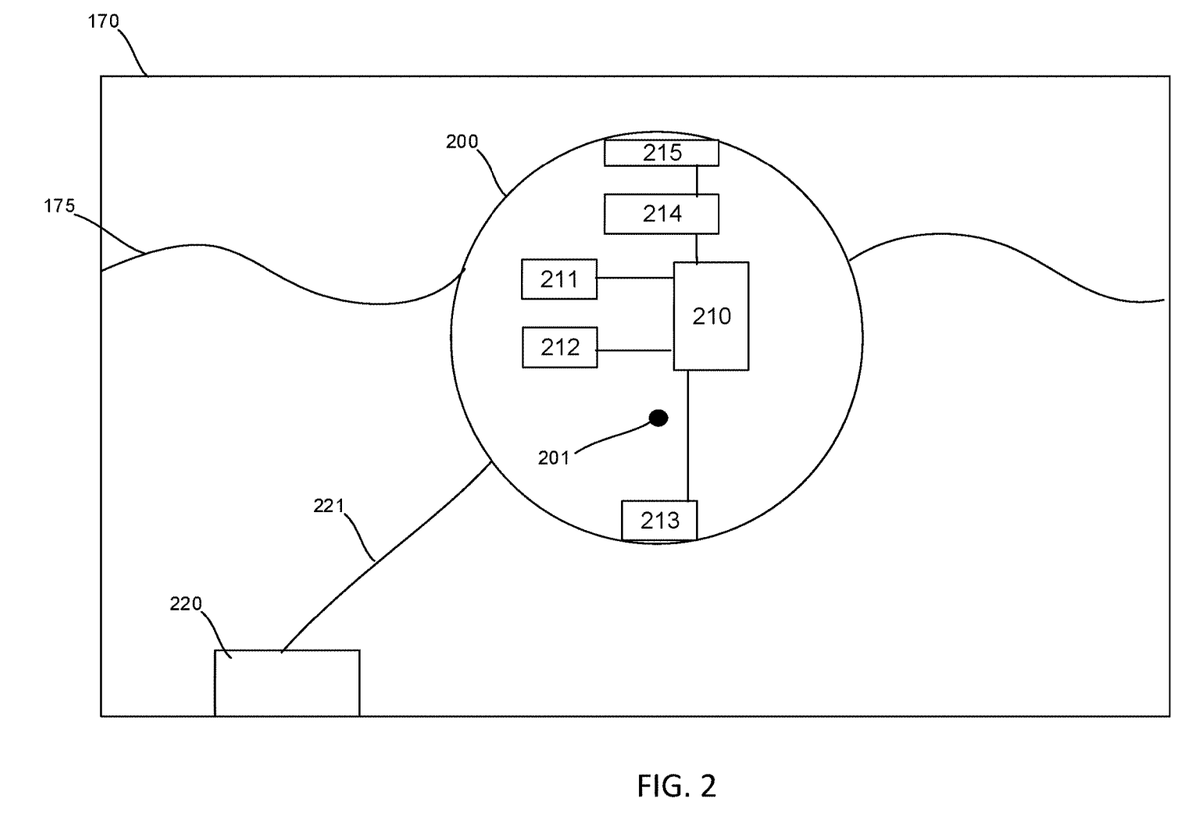
FIG. 2 shows a pool usage sensor.

Pool usage may be determined automatically without a need for manual data entry by a pool occupancy sensor 200 as shown in FIG. 2. The pool occupancy sensor 200 may be floating on the water surface 175 within the pool 170. The pool occupancy sensor 200 may be tethered to an anchor 220 by a rope 221. The anchor 220 may e.g. be a weight that is placed on the bottom of the pool. The anchor 220 may also be a suction cup mounted to a side wall of the pool. The anchor 220 can prevent the pool occupancy sensor 200 from being sucked into the skimmer 171 of the pool when the pool pump 110 is running.

The pool occupancy sensor 200 may have a center of gravity 201 that is eccentrical relative to a center of lift, thereby providing a predetermined orientation of the pool occupancy when floating. The pool occupancy sensor 200 may comprise a battery 211 which powers a processor 210. The processor 210 may be operatively connected to an acceleration sensor 212. The processor 210 may further be connected to a radio transmitter or transceiver 214, the radio transmitter or transceiver 214 being connected to an antenna 215. The antenna 215 may be arranged within the pool occupancy sensor 200 above the center of gravity such that the antenna extends above the water surface 175 when the pool occupancy sensor floats on the water. Opposite the antenna 215 on a lower end of the pool occupancy a temperature sensor 213 may be arranged which is submerged in the water when the occupancy sensor 200 floats, thereby allowing the temperature sensor to measure the water temperature in the pool.

By evaluating acceleration sensed by acceleration sensor 212 over time the processor 210 can determine pool usage time and approximate usage intensity. Stronger accelerations caused by waves in the water indicate heavier usage. The pool usage may be communicated from the pool occupancy sensor 200 wirelessly to the user interface device 160, the server 120, the local processor 105, or a combination thereof.

The pool occupancy sensor 200 may operate in a child safety mode. In this mode the pool occupancy sensor may cause the user interface device 160 to issue an alert when an acceleration of the occupancy sensor is detected that is consistent with a child having fallen into the pool 170.

The pool monitoring and control system 100 may utilize pattern detection to recognize events. For example, the pool monitoring and control system 100 may monitor electrical parameters of the pool pump's motor current to identify the presence of a maintenance event. As described above, the pattern may be a characteristic sequence of turning the pump on and off, which may be associated with a change in electrical parameters before and after the event.

While monitoring the motor current is a relatively easy and low cost approach, one skilled in the art will appreciate that the pattern recognition can be applied to other inputs. For example, if equipped with a flow sensor 132/133 or a pressure sensor the pool monitoring and control system 100 may apply a pattern matching algorithm to inputs from those sensors. Patterns may extend over widely different time periods. For example, a pool service maintenance event such a filter cleaning operation may be detected by analyzing inputs over several minutes, e.g. between 0.5 and 10 min. Other events may require larger or shorter periods of time.

The pool monitoring and control system 100 may provide additional features based on detecting anomalies. In particular, the pool pump control system may learn, over the course of several days or weeks, typical motor current parameters and establish a lower threshold and an upper threshold based thereon. For example, the local processor 105 or the server 120 may be programmed to calculate a lower threshold of an electric parameter, such as motor current, and store an associated numeric value in a non-volatile memory. An observation of a motor current below the stored lower threshold indicates an anomaly.

The anomaly detection may be used to protect a pool pump 110 from permanent damage if the fluid pump 112 is running dry. The pool monitoring and control system 100 may be programmed to detect a dry running pool pump 110 based on pool pump electric current characteristics outside of a learned normal operating envelope. In particular, a dry running pump 112 may be detected by its motor 111 consuming significantly less than typical power. When detected, the pool pump control system may alert a user through a user interface 160 and/or may turn off the pool pump by opening switches 101,102 automatically.

The anomaly detection may also be used to protect a pool pump motor 111 from permanent damage if the electric motor 111 fails to start. A motor that fails to start may be detected by a characteristic high starting current extending longer than usual, followed by a drop of current to zero as the motor 111 overheats and switches off. This pattern typically repeats frequently. When the pattern is detected, the pool pump control system may alert a user through a user interface 160 and/or may turn off the pool pump 110 by opening switches 101,102 automatically.

The pool monitoring and control system 100 may comprise further local sensors operatively connected to the local processor 105. For example, the pool monitoring and control system 100 may include a local air temperature sensor 134 and a sun intensity sensor 135. The local sensors 134,135 may substitute or augment information obtained from a weather service provider 121.

The pool monitoring and control system 100 may utilize switches 101,102 to selectively turn the pool pump 110 on and off. Preferably, the voltage monitoring 103 and current monitoring circuit 104 is connected to the supply lines on the pump side of the switches 101,102. This allows the pool monitoring and control system 100, through its local processor 105, to monitor proper operation of the switches 101,102. If one of the switches is stuck, the local processor 105 will register a voltage on the motor-side of the switches 101,102 which should not be present. This may be caused e.g. by a stuck relay. The pool monitoring and control system 100 may be programmed to alert a user to this malfunction by issuing an alert through the user interface 160.

Through its user interface 160 the pool pump control system 100 may ask a user to annotate detected events to further improve future event detection. For example, the user interface 160 may provide a display asking a user to enter whether a recent event in which the pool pump was manually switched off was related to a filter backwash, related to removal of debris from the strainer, or unrelated to maintenance.

The pool monitoring and control system 100 may control the pool heater 150 and may be programmed to maintain a desired pool temperature. Since water can only be heated and cooled while circulating, the pool monitoring and control system 100 may be programmed to maintain circulation irrespective of a filtering need to reach a desired temperature. The pool monitoring and control system 100 may learn the specific heating performance of the pool heater 150. For example, the pool monitoring and control system 100 may store data in a non-volatile memory associating a temperature rise per time period when the heater 150 is on and water is circulating. The pool monitoring and control system 100 may comprise a look-up table with a plurality of numeric values which have been established by prior observation of the heating performance for a specific pool. The data stored in the look-up table may be multi-dimensional to consider additional factors. The pool-pump control system may e.g. store data associating temperature rise over time with the pool water temperature as received from a temperature sensor 131, with exterior temperature as received from a weather service 121, and with sun intensity or cloud coverage data as received from a weather service 121.

The pool monitoring and control system 100 may provide a user interface allowing a user to select a desired target temperature of the pool at a given time. The pool monitoring and control system 100 may be programmed to compare the target temperature of the pool at the given time with the present temperature, calculate a temperature delta, look up a heating performance value of the given pool, and calculate the amount of time required to heat the pool to the desired temperature. The pool monitoring and control system 100 may then activate the pump 110 and the heater 150 at the calculated time period before the target time to raise the temperature of the pool to the desired level at the desired time. The same applies to cooling a pool using a pool cooling system instead of a heater 150.

For example, a user may set, through a user interface, a desired pool temperature of 30° C. at 9 a.m. The pool control system 100 monitors the pool water temperature using a temperature sensor 131. The temperature sensor may indicate that the pool water has a temperature of 27° C. The pool monitoring and control system 100 may receive information from a weather service 121 that the ambient temperature at the pool is 25° C., that sunrise is at 6:35 am, and that the sky is overcast. The pool monitoring and control system 100 may look up a learned heating performance value of 0.8°/h given the ambient environment of 25° C. and overcast sky. The pool pump control system then calculates a time of (30°−27°)/0.8°/h=3.75 h that is needed to heat the pool from its present temperature to the desired 30° C. The pool pump control system thus activates the pool pump 110 and the heater 150 at 9 a.m.-3.75 h=6.15 a.m.

The pool control system 100 may offer a user, through the user interface 160, to temporarily override automatic controls. For example, the user interface 160 may allow a user to activate a "24 h run" that keeps the pool pump active for a period of 24 h. Such a 24 h run mode may be desired following an application of chemicals to the pool which requires continued water circulation to distribute the applied chemicals. The user interface may provide a single-button option to activate a preset time period of manual override (such as 24 h) or allow the user to adjust the time period of the manual override (e.g. in increments of 30 min). Similarly, the user interface 160 may provide an option to delay pump activation for a given period of time.

Variable speed pool pumps are increasingly used for their energy savings over fixed speed pool pumps. A variable speed pool pump may be operated such that it runs 24/7, adjusting the pump's speed to account for different turnover volume. The pool monitoring and control system 100, when connected to a variable speed pump, may communicate with the pump motor 111 through a serial data signal. The pool monitoring and control system 100 may utilize external weather information 121 to adjust the turnover volume without affecting the run time of the pump.

Figure 4:
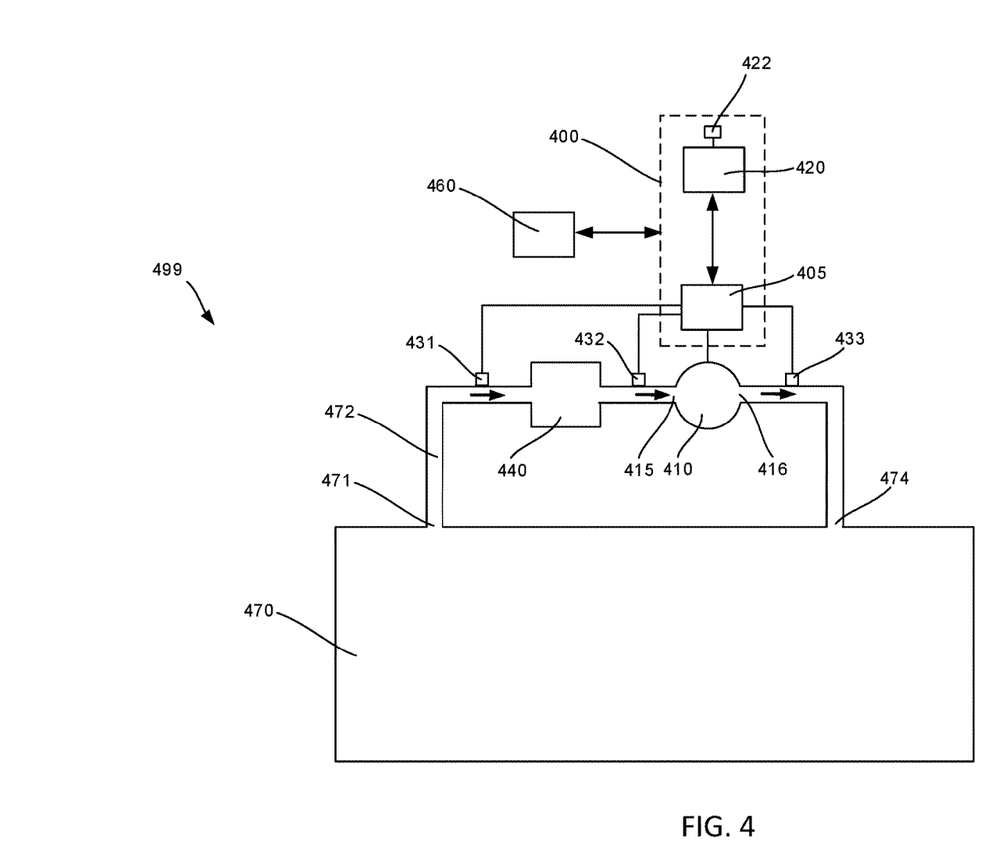
FIG. 4 is a schematic illustration of a fluid circulation monitoring system.

Shown in FIG. 4 is a schematic illustration of a fluid circulation system 499. A space 470 is filled with a fluid. The fluid may be a gas or a liquid. Fluid is sucked through an inlet opening 471 into a fluid channel 472. The fluid channel 472 may e.g. be a pipe, or a duct. The fluid flows through a fluid conditioning device 440. The fluid conditioning device may be a stand-alone filter, or a heating and/or cooling device which may include a filter component. A fluid pump 410 sucks fluid from an inlet opening 415 and pushes the fluid through an outlet opening 416. The fluid re-enters the space 470 through an outlet 474. The fluid pump 410 may be a fan in applications where the fluid is a gas.

A distributed monitoring and control system 400 is operatively connected to the fluid pump 410 and to one or more sensors 431,432,433. The distributed monitoring and control system 400 uses a first processor 405 which communicates with a second processor 420. The first processor is physically located on-premises, arranged close to the space 470 and the fluid pump 410. The second processor is physically located off-premises, arranged typically in a server in a data center far from the space 470.

The first processor and/or the second processor has access to a non-volatile memory 422. The non-volatile memory may for example be a flash memory, EEPROM, an optical memory storage device or a magnetic memory storage device such as a hard disk drive.

The distributed monitoring and control system 400 communicates with an operator through a user interface device 460. The user interface device 460 may e.g. be a display and button arrangement that is operatively connected to the first processor 405. It may also be a hand-held device being in communication with the second processor 420.

Data from the sensors 431,432,433 is read into the first processor 405. The sensor data may be processed within the first processor 405 and processed sensor data may be communicated from the first processor 405 to the second processor 420. Processing of the sensor data within the first processor 405 may include filtering of sensor data, averaging of sensor data, and detecting changes within the sensor data. The processed data communicated from the first processor 405 to the second processor 420 may include filtered sensor data, averaged sensor data, compressed sensor data, or events related to sensor data. The sensors 431,432,433 may include temperature sensors, pressure sensors, and flow sensors.

The distributed monitoring and control system 400 is designed to be used with numerous different fluid circulation systems 499, none of which has exactly the same characteristics as another. For example, the system may be applied to a home heating application. In that case the fluid circulation system 499 is a forced air heating and cooling system and the space 470 are rooms within a building. The fluid conditioning device 440 is the home's furnace including an air filter. A task for the distributed monitoring and control system 400 may be to detect the degree to which an air filter has been blocked so as to advise a user through the user interface device 460 that it is time to change the air filter at the furnace 440. The distributed monitoring and control system 400 may utilize a pressure sensor 431 to determine the degree to which the air filter is blocked. However, a single reading of pressure within the air duct 472 alone is insufficient to determine the degree to which the air filter is blocked. That is, because the pressure in the air duct 472 depends on many different factors such as barometric pressure, characteristics of the air ducts, and characteristics of the furnace and its fan.

The distributed monitoring and control system 400 is programmed to learn, over the course of several days, to distinguish such environmental factors from the factor of interest, which is filter blockage. The distributed monitoring and control system 400 does so by first detecting an operating state of the fan 410. It can do so without being connected to the fan 410 simply by sensing the pressure within the air duct 472 and applying a pattern recognition algorithm to detect a jump in pressure. Provided the pressure sensor 431 is on the suction side of the fan, upstream of the filter, a sudden jump from a higher pressure to the lower pressure indicates that the fan has been turned on. A sudden jump from a lower pressure to a higher pressure indicates that the fan has been turned off.

The distributed monitoring and control system 400 may further compare the pressure while the fan is running with the pressure while the fan is off. This provides a differential pressure signal which eliminates barometric pressure as a noise factor.

The differential pressure alone does not provide sufficient information as to whether the filter is blocked or not. The distributed monitoring and control system 400 is further programmed to record and store data relating to the pressure difference in the air duct 472 while the fan is on with the pressure while the fan is off. Over several weeks this pressure difference tends to become smaller as the air filter becomes more blocked and less air is flowing through. Once the filter is replaced, the pressure difference increases from one fan activation cycle to the next.

The distributed monitoring and control system 400 thus monitors a sensor input to detect a first pattern to decide whether the fan is on or off, i.e. to detect an operating state of the system. It monitors the same sensor input to detect a maintenance event, here the change of an air filter in a forced air heating system. Having recorded the sensor data associated with the maintenance event, the distributed monitoring and control system 400 can now predict the need of a future maintenance event.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A monitoring system for a pool pump, comprising:
a distributed processing system having a first processor located on-premises near a pool and a second processor located off-premises away from the pool, the first processor and the second processor being in communication with one another; and
a sensor operatively connected to the first processor, the sensor being configured to sense at least one parameter of an electric power applied to a single phase AC pool pump motor that drives the pool pump,
wherein the first processor communicates data to the second processor relating to the at least one parameter of the electric power, the at least one parameter being selected from the group consisting of a current, a voltage, an apparent power, an active power, a reactive power, and a phase angle,
wherein the distributed processing system is configured to process the at least one parameter of the electric power in the second processor by comparing data received from the first processor over two or more days and derive a volumetric water flow through the pool pump, and
wherein the distributed processing system is configured to detect a maintenance event by recognizing a characteristic pattern of the at least one parameter of the electric power.

2. The monitoring system as in claim 1,
wherein the distributed processing system is configured to recognize a need for a maintenance event by recognizing a characteristic pattern of at the least one parameter of the electric power.

3. The monitoring system as in claim 1,
wherein the second processor is programmed to store the data received from the first processor and wherein the second processor is programmed to analyze the data received from the first processor to recognize a pool filter backwash event.

4. The monitoring system as in claim 1,
wherein the distributed processing system recognizes a pool filter backwash event by detecting a pool pump motor activation pattern comprising at least two pattern elements selected from the group consisting of
the pool pump motor being on for longer than a predetermined time $t_{continuous}$,
the pool pump motor being off for longer than a predetermined time $t_{port\_adjust\_min}$ and for less than a predetermined time $t_{port\_adjust\_max}$,
the pool pump motor being on for longer than a predetermined time $t_{backwash\_min}$ and for less than a predetermined time $t_{backwash\_max}$,
the pool pump motor being off for longer than a predetermined time $t_{port\_adjust\_min2}$ and for less than a predetermined time $t_{port\_adjust\_max2}$,
the pool pump motor being on for longer than a predetermined time $t_{rinse\_min}$ and for less than a predetermined time $t_{rinse\_max}$, and
the pool pump motor being on for longer than a predetermined time $t_{continuous2}$.

5. The monitoring system as in claim 1,
wherein the distributed processing system determines a minimally desirable volumetric water flow and compares the derived volumetric water flow through the pool pump with the minimally desirable volumetric water to generate a maintenance signal.

6. The monitoring system as in claim 5,
wherein the minimally desirable volumetric water flow is determined by a calibration routine.

7. The monitoring system as in claim 6,
wherein the calibration routine comprises a step instructing a user to a least partially close a valve within a pool water circulation system.

8. The monitoring system as in claim 1,
wherein the distributed processing system is configured to generate a dry running pump signal when a characteristic value of the at least one parameter of the electric power is detected and to issue an alert through a user interface device when a dry running pump signal is present.

9. A monitoring and control system for a pool pump, comprising:
a distributed processing system having a first processor located on-premises near a pool and a second processor located off-premises away from the pool, the first processor and the second processor being in communication with one another;
a sensor operatively connected to the first processor, the sensor being configured to sense at least one parameter of an electric power applied to a pool pump motor that drives the pool pump; and
a switch for turning the pool pump motor on an off, the switch being operatively connected to the first processor,
wherein the first processor communicates data to the second processor relating to the at least one parameter of the electric power, the at least one parameter being selected from the group consisting of a current, a voltage, an apparent power, an active power, a reactive power, and a phase angle, and wherein the distributed processing system is configured to process the at least one parameter of the electric power in the second processor by comparing data received from the first processor over two or more days and derive a volumetric water flow through the pool pump, and wherein the distributed processing system calculates a pool pump run time based on a volume of water to be turned over and the derived volumetric water flow through the pool pump and wherein the first processor turns the pool pump on by closing the switch for the calculated run time.

10. The monitoring and control system as in claim 9, wherein the distributed processing system is configured to receive weather information and wherein the distributed processing system adjusts the pump run time based on the received weather information.

11. The monitoring and control system as in claim 9, wherein the distributed processing system is configured to generate a filter backwash reminder signal when the volumetric water flow through the pool pump falls below a filter backwash alert value.

12. The monitoring and control system as in claim 11, wherein the distributed processing system is configured to activate a user interface device when the filter backwash reminder signal is present.

13. The monitoring and control system as in claim 9, wherein the distributed processing system is configured to establish a filter backwash alert value by detecting a filter backwash event and storing a numeric value associated with the volumetric water flow through the pool pump before the filter backwash event occurred.

14. The monitoring and control system as in claim 13, wherein the distributed processing system is configured to establish the filter backwash alert value by filtering multiple values associating the volumetric water flow through the pool pump before multiple filter backwash events.

* * * * *